(12) United States Patent
Hojo

(10) Patent No.: US 7,321,222 B2
(45) Date of Patent: Jan. 22, 2008

(54) SWITCHING REGULATOR WITH DC OFFSET (BIAS) IN CONTROLLER

(75) Inventor: Yoshiyuki Hojo, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/589,163

(22) PCT Filed: Jan. 20, 2005

(86) PCT No.: PCT/JP2005/000637

§ 371 (c)(1),
(2), (4) Date: Aug. 10, 2006

(87) PCT Pub. No.: WO2005/078910

PCT Pub. Date: Aug. 25, 2005

(65) Prior Publication Data

US 2007/0170904 A1    Jul. 26, 2007

(30) Foreign Application Priority Data

Feb. 13, 2004    (JP)    ............................ 2004-036770

(51) Int. Cl.
*G05F 1/613*    (2006.01)
*G05F 1/40*    (2006.01)

(52) U.S. Cl. .................. 323/224; 323/283; 323/284
(58) Field of Classification Search ............... 323/224, 323/283, 284, 285
See application file for complete search history.

(56) References Cited

U.S. PATENT DOCUMENTS 5,731,694 A * 3/1998 Wilcox et al. .............. 323/287

FOREIGN PATENT DOCUMENTS

| JP | 06-284733 | 10/1994 |
| JP | 11-075367 | 3/1999 |
| JP | 2000-299978 | 10/2000 |

* cited by examiner

*Primary Examiner*—Shawn Riley
(74) *Attorney, Agent, or Firm*—Fish & Richardson P.C.

(57) ABSTRACT

After a current value flowing through a coil L is detected, it is converted into a voltage value, is then inputted to an inverting input terminal of a comparator 4, and is then compared with a voltage indicating the difference between the value of a fed back output voltage and a reference voltage. A voltage source 20 is provided at the inverting input terminal of the comparator 4 so that an offset voltage is added to the voltage value to be inputted to the inverting input terminal of the comparator 4.

8 Claims, 7 Drawing Sheets

SWITCHING REGULATOR WITH DC OFFSET (BIAS) IN CONTROLLER

TECHNICAL FIELD

The present invention relates to a switching power supply apparatus that reduces the loss at light load and thus improves efficiency. More particularly, the present invention relates to a switching power supply apparatus that adopts current mode by which switching control is performed by detecting a coil current on an output side, and a mobile device that incorporates the switching power supply apparatus and achieves low power consumption.

BACKGROUND ART

Conventionally, in a switching power supply apparatus that controls the amount of current to be fed to a load by controlling on/off of a built-in switching device, intermittent control is employed that permits switching to an intermittent switching operation having the duration for which a switching operation of the switching device is stopped in order to reduce the loss of the switching power supply apparatus at light load (see Patent Publication 1). The switching power supply apparatus performing the aforementioned intermittent control is provided with a comparator that compares a voltage commensurate with an output voltage with a reference voltage Vburst for intermittent control.

When the comparator finds the voltage commensurate with the output voltage to be higher than the reference voltage Vburst because of light load, the switching control operation of the switching device performed by a driver is stopped. Then, because of hysteresis exhibited by the comparator, when the comparator finds the output voltage to be lower, the switching control operation of the switching device performed by the driver is resumed. By repeating such an operation at light load, the intermittent control by the comparator for intermittent control is performed, whereby the efficiency of the intermittent control is increased.

Patent Publication 1: JP-A-H06-303766

DISCLOSURE OF THE INVENTION

Problems to be Solved by the Invention

However, this conventional switching power supply apparatus needs to be provided with a comparator for intermittent control for intermittently performing a switching operation of a switching device by a driver to increase efficiency at light load. This additional comparator for intermittent control increases the size of the circuitry constituting the switching power supply apparatus, and thus hinders miniaturization of a mobile device in which the switching power supply apparatus is incorporated.

In view of the conventionally experienced inconveniences and disadvantages described above, an object of the present invention is to provide a switching power supply apparatus that can maintain high efficiency without requiring an additional circuit for intermittent control at light load.

Means for Solving the Problem

To achieve the above object, according to the present invention, a switching power supply apparatus is provided with: a switching device for performing an on/off operation; a control circuit for controlling on/off of the switching device; a coil, a level of a current flowing therethrough being controlled by the switching device; a capacitor that is connected to the coil and that performs rectification together with the coil; and an oscillator for outputting to the control circuit an oscillating signal at intervals of a fixed time period for turning the switching device on. This switching power supply apparatus outputs an output voltage from a node at which the capacitor and the coil are connected together, and further includes: a current detection portion for detecting a current value flowing through the coil, converting the detected current value into a voltage value, and then outputting the voltage value thus obtained as a current detection voltage; a voltage source for adding an offset voltage to the current detection voltage from the current detection portion; and a comparator for comparing the current detection voltage to which the offset voltage is added by the voltage source with a voltage commensurate with the difference between a voltage commensurate with the output voltage and a reference voltage. Here, if the comparator finds the magnitude of the current detection voltage to which the offset voltage is added to be greater than the voltage commensurate with the difference between the voltage commensurate with the output voltage and the reference voltage, the oscillating signal from the oscillator is masked, and the switching device is turned off.

Effect of the Invention

According to the present invention, at no load or light load in which the difference between an output voltage and a reference voltage is small, adding an offset voltage to a current detection voltage indicating a detected current value flowing through a coil makes it possible for a comparator to find the magnitude of the current detection voltage to be greater than the difference between the output voltage and the reference voltage. In that case, an oscillating signal outputted from an oscillator for turning a switching device on can be masked. This makes it possible to perform intermittent control of a switching operation of the switching device until the difference between the output voltage and the reference voltage becomes greater. Thus, unlike the conventional example, there is no need to add a comparator for intermittent control. This makes it possible to maintain high efficiency at light load or no load, and achieve miniaturization of an apparatus.

LIST OF REFERENCE SYMBOLS

| | |
|---|---|
| 1 | driver |
| 2 | differential amplifier |
| 3 | level shifter |
| 4 | comparator |
| 5 | RS flip-flop |
| 6 | oscillator |
| 20, 20a, 21 | voltage source |
| Tr1, Tr2 | MOS transistor |
| L | coil |
| C | capacitor |
| R1, R2 | resistance |

BEST MODE FOR CARRYING OUT THE INVENTION

First Embodiment

Figure 1:
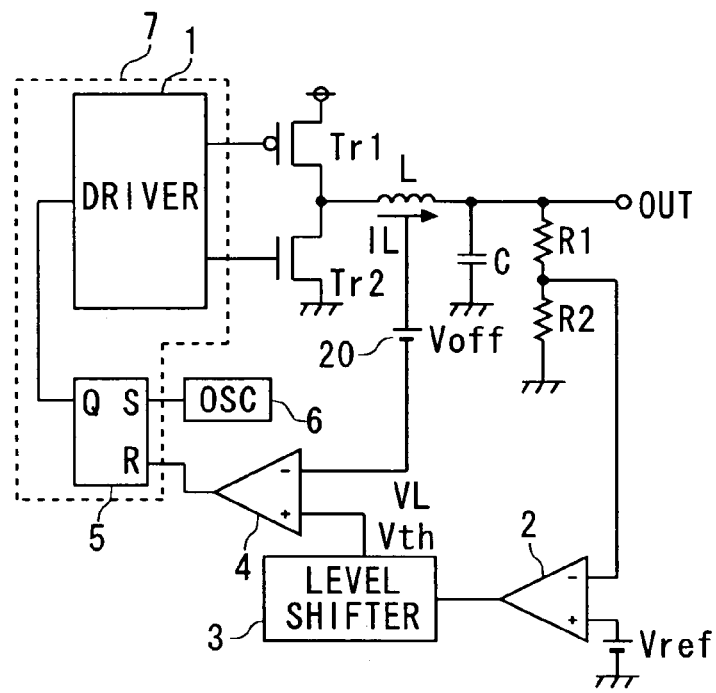
FIG. 1 A block diagram showing the internal configuration of the switching power supply apparatus of a first embodiment.

Hereinafter, a first embodiment of the present invention will be described with reference to the accompanying drawings. FIG. 1 is a block diagram showing the internal configuration of the switching power supply apparatus of this embodiment.

The switching power supply apparatus shown in FIG. 1 includes a p-channel MOS transistor Tr1 having a source to which a supply potential is applied, an n-channel MOS transistor Tr2 having a source to which a ground potential is applied, a driver 1 that feeds a signal to the gates of the MOS transistors Tr1 and Tr2 and thereby controls on/off thereof, a coil L that is connected, at one end thereof, to a node at which the drains of the MOS transistors Tr1 and Tr2 are connected together, a capacitor C that is connected, at one end thereof, to the other end of the coil L, and is grounded at the other end thereof, resistances R1 and R2 that are connected in series between a node at which the coil L and the capacitor C are connected together and the ground potential, a differential amplifier 2 that receives the voltage obtained by dividing the voltage appearing at the node at which the coil L and the capacitor C are connected together by the resistances R1 and R2, and receives a reference voltage Vref, a level shifter 3 that level shifts the output voltage from the error amplifier 2, a comparator 4 that compares the voltage from the level shifter 3 with the voltage indicating the current flowing through the coil L, an RS flip-flop 5 that receives, at a reset terminal thereof, an output from the comparator 4, and an oscillator 6 that inputs a signal to a set terminal of the RS flip-flop 5.

The driver 1 and the RS flip-flop 5 constitutes a control circuit 7, and a voltage source 20 that adds an offset voltage Voff (for example, 30 mV) to the voltage indicating the detected current value flowing through the coil L is connected to an inverting input terminal of the comparator 4. That is, when a current value IL flowing through the coil L is converted into a voltage value VL and is then inputted to the inverting input terminal of the comparator 4, the offset voltage Voff from the voltage source 20 is added thereto. Then, in the comparator 4, the voltage value VL to which the offset voltage Voff is added is compared with a voltage Vth that is fed back through the differential amplifier 2 and the level shifter 3 to a non-inverting input terminal of the comparator 4.

Figure 2:
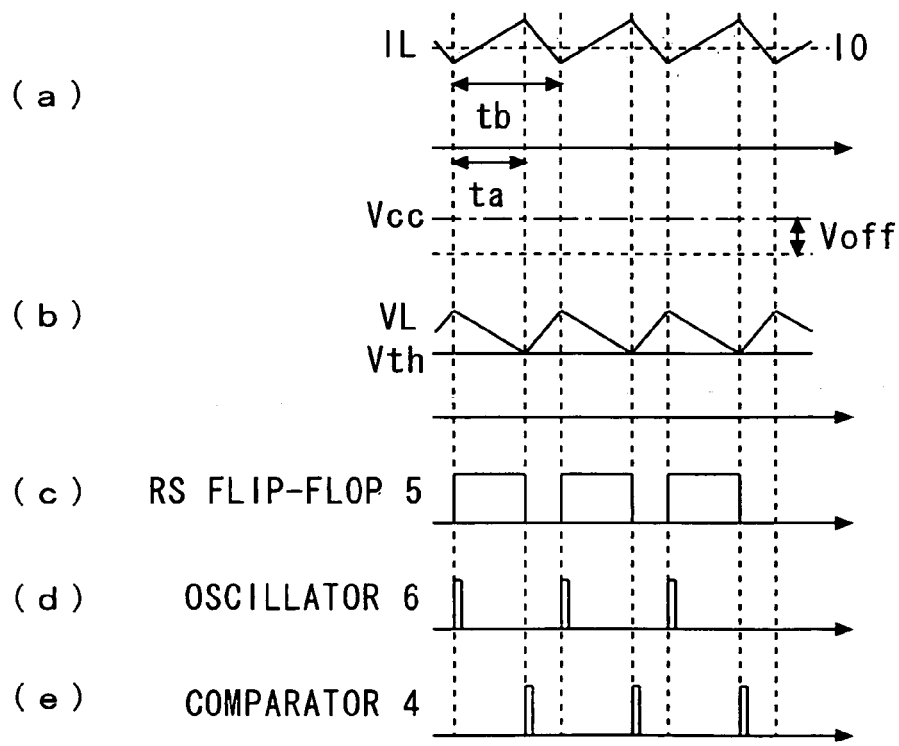
FIG. 2 A timing chart showing how relevant parts of the switching power supply apparatus shown in FIG. 1 operate at heavy load.

In the switching power supply apparatus configured as described above, when a heavy load is connected to an output terminal OUT that is a node at which the coil L and the capacitor C are connected together, this switching power supply apparatus operates in the same manner as a conventional switching power supply apparatus. A transition diagram showing the transition of the signals of relevant parts is shown in FIG. 2. As shown in FIG. 2($d$), when a high-level clock signal is fed from the oscillator 6 to the set terminal of the RS flip-flop 5, the output of the RS flip-flop 5 turns to high level, as shown in FIG. 2($c$), whereby the driver 1 turns the MOS transistor Tr1 on and the MOS transistor Tr2 off.

As a result, a current flows from the MOS transistor Tr1 to the coil L, and thus the current value IL flowing through the coil L increases, as shown in FIG. 2($a$). Thus, as shown in FIG. 2($b$), the voltage VL inputted to the inverting input terminal of the comparator 4 decreases. Note that a current value 10 shown in FIG. 2($a$) indicates an average current value IL flowing through the coil L. As shown in FIG. 2 ($b$, if the voltage VL becomes lower than the voltage Vth inputted from the level shifter 3 to the non-inverting input terminal of the comparator 4 when time ta has elapsed after reception of the high-level clock signal from the oscillator 6, a high-level signal is outputted from the comparator 4, as shown in FIG. 2($e$).

Incidentally, the output voltage appearing at the output terminal OUT is divided by the resistances R1 and R2, and the voltage thus obtained is then fed back to the differential amplifier 2, where the difference between the voltage thus obtained and the reference voltage Vref is amplified, and then a voltage signal indicating an error between a feedback voltage indicating the output voltage and the reference voltage Vref is outputted. Then, this voltage signal is fed to the level shifter 3, where it is level shifted to a supply potential side. As a result, when the output voltage appearing at the output terminal OUT increases, the voltage from the differential amplifier 2 decreases, and thus the voltage value of the voltage Vth outputted from the level shifter 3 increases. As described above, the voltage Vth fed from the level shifter 3 to the non-inverting input terminal of the comparator 4 indicates the output voltage appearing at the output terminal OUT.

Since the high-level signal is inputted from the comparator 4 to the reset terminal of the RS flip-flop 5, the output of the RS flip-flop 4 turns to low level, as shown in FIG. 2(c), whereby the driver 1 turns the MOS transistor Tr1 off and the MOS transistor Tr2 on. As a result, as shown in FIG. 2(a), the current value IL flowing through the coil L decreases, and current begins to flow from the coil L to the MOS transistor Tr2. Thus, as shown in FIG. 2(b), the voltage VL inputted to the inverting input terminal of the comparator 4 increases. When time tb has elapsed after reception of the high-level clock signal from the oscillator 6, a next clock signal is outputted from the oscillator 6, as shown in FIG. 2(d). In this way, the aforementioned operation is repeated.

By repeating the operation described above, a substantially constant direct-current voltage is outputted from the output terminal OUT to the load. That is, by adjusting the duration ta for which the MOS transistor Tr1 is turned on relative to a time period tb of the clock signal outputted from the oscillator 6 based on the result of comparison between the current value flowing through the coil L and the output voltage of the output terminal OUT, it is possible to keep the output voltage of the output terminal OUT constant. It is to be noted that, when a heavy load is connected as described above, the voltage obtained by detecting the current IL flowing through the coil L is sufficiently higher than the offset voltage Voff from the voltage source 20. That is, the offset voltage Voff falls within the voltage range in which the influence thereof on the voltage VL inputted to the inverting input terminal of the comparator 4 is so small that it can be ignored.

Figure 3:
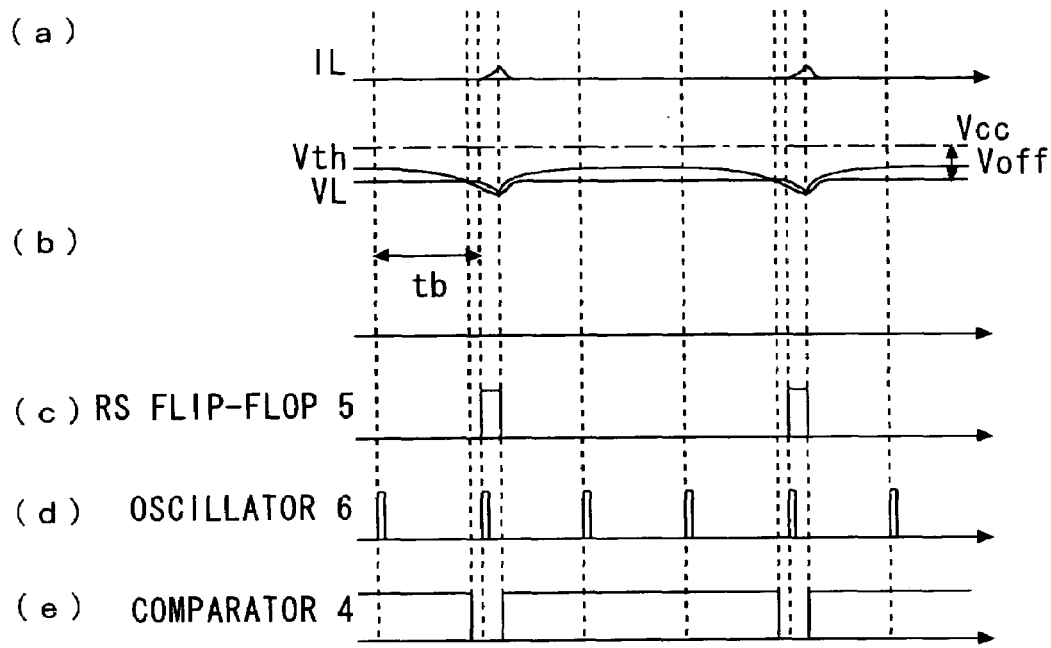
FIG. 3 A timing chart showing how relevant parts of the switching power supply apparatus shown in FIG. 1 operate at light load or no load.

Now, an operation performed when no load or a light load is connected to the output terminal OUT will be described below with reference to FIG. 3. In this case, since the output voltage appearing at the output terminal OUT increases, and thus an error between the divided voltage obtained by the resistances R1 and R2 and the reference voltage Vref becomes smaller, the voltage from the differential amplifier 2 decreases. This makes high the voltage value of the voltage Vth outputted from the level shifter 3, as shown in FIG. 3(b). As described above, the voltage Vth fed from the level shifter 3 to the non-inverting input terminal of the comparator 4 indicates the output voltage appearing at the output terminal OUT.

At this time, since the MOS transistor Tr1 is turned off and the MOS transistor Tr2 is turned on, and no current flows through the coil L, as shown in FIG. 3(a), the voltage VL fed to the inverting input terminal of the comparator 4 becomes a value given by Vcc−Voff, the value obtained by dropping a supply voltage Vcc by the offset voltage Voff fed from the voltage source 20. As shown in FIG. 3(b), when the voltage Vth outputted from the level shifter 3 is higher than the voltage VL (=Vcc−Voff), a high-level signal is outputted from the comparator 4.

Thus, as shown in FIG. 3(d), even when a high-level clock signal is outputted from the oscillator 6 at intervals of a time period tb, the RS flip-flop 5 continues to output a low-level signal, as shown in FIG. 3(c), because a high-level signal is inputted from the comparator 4 to the reset terminal of the RS flip-flop 5, as shown in FIG. 3(e). Thus, the driver 1 keeps the MOS transistor Tr1 off and the MOS transistor Tr2 on.

At this time, since the capacitor C is discharged, the output voltage of the output terminal OUT decreases. As a result, as shown in FIG. 3(b), the voltage value of the voltage Vth outputted from the level shifter 3 gradually decreases. When the voltage Vth outputted from the level shifter 3 becomes lower than the voltage VL (=Vcc−Voff), a low-level signal is outputted from the comparator 4, as shown in FIG. 3(e). As described above, when a high-level clock signal is outputted from the oscillator 6, as shown in FIG. 3(d). after the signal from the comparator 4 is switched to low level, the signal from the RS flip-flop 5 is switched to high level, as shown in FIG. 3(c).

Thus, the driver 1 turns the MOS transistor Tr1 on and the MOS transistor Tr2 off, whereby a current begins to flow through the coil L, as shown in FIG. 3(a). As a result, the voltage VL inputted to the inverting input terminal of the comparator 4 is dropped by the current IL flowing through the coil L. As the current IL flowing through the coil L increases, as shown in FIG. 3(a), the voltage VL inputted to the inverting input terminal of the comparator 4 decreases, as shown in FIG. 3(b). When the voltage VL becomes lower than the voltage Vth from the level shifter 3, as shown in FIG. 3(b), the signal from the comparator 4 is switched to high level, as shown in FIG. 3(e). As a result, the signal from the RS flip-flop 5 turns to low level, as shown in FIG. 3(c).

As described above, the signal from the RS flip-flop 5 turns to low level, the driver 1 turns the MOS transistor Tr1 off and the MOS transistor Tr2 on, and the current value IL flowing through the coil L decreases, as shown in FIG. 3(a). At this time, the energy stored in the coil L is released, whereby the capacitor C is charged, and thus the output voltage from the output terminal OUT increases. As a result, as shown in FIG. 3(b), the voltage Vth from the level shifter 3 increases. After that, the capacitor C is discharged again, whereby the output voltage from the output terminal OUT decreases. In this way, the aforementioned operation is repeated.

By repeating the operation described above, it is possible to mask the clock signal from the oscillator 6 by feeding a high-level signal to the reset terminal of the RS flip-flop 5 while the voltage from the output terminal OUT is higher than a predetermined voltage. This makes it possible to make the duration for which the MOS transistor Tr1 is turned on longer than that obtained under heavy load conditions, and make the duty ratio, i.e., the ratio of the duration of time that the MOS transistor Tr1 is turned on, smaller than that obtained under heavy load conditions. That is, by performing a switching operation, which is performed at heavy load at intervals of a time period tb, once in a plurality of periods, it is possible to improve efficiency at no load or light load.

Figure 4:
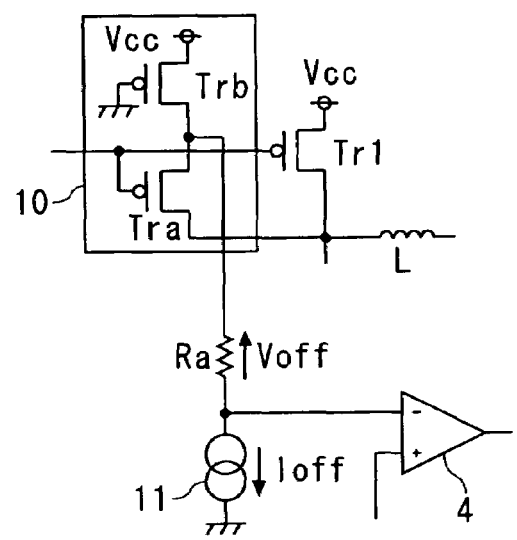
FIG. 4 A circuit diagram showing an example of the configuration of the current detection circuit and a portion surrounding it in the switching power supply apparatus shown in FIG. 1.

FIG. 4 shows an example of the configuration of a current detection circuit 10 that detects the level of a current flowing through the coil L and then converts it into a voltage value in the switching power supply apparatus described above. That is, the current detection circuit 10 is built with a p-channel MOS transistor Tra having a gate and a drain connected respectively to the gate and the drain of the MOS transistor Tr1 and a p-channel MOS transistor Trb having a drain connected to the source of the MOS transistor Tra, a source receiving a supply potential, and a gate receiving a reference potential.

In this configuration, the MOS transistor Trb functions as a resistance. When the same voltage as that fed to the gate of the MOS transistor Tr1 from the driver 1 is fed to the gate of the MOS transistor Tra, the MOS transistor Tra is made to operate. At this time, the voltage appearing at a node at which the drains of the MOS transistors Tr1 and Tr2 are connected together is fed to the drain of the MOS transistor Tra, and the current proportional to the current flowing through the MOS transistor Tr1 flows through the MOS transistors Tra and Trb.

Then, the voltage drop across the ON resistance of the MOS transistor Trb appears as a value proportional to the current value proportional to the current flowing through the MOS transistor Tr1, that is, a value proportional to the current value flowing through the coil L. As described above, the voltage drop across the ON resistance of the MOS transistor Trb appears, as a detected current value of the coil L, at a node at which the source of the MOS transistor Tra and the drain of the MOS transistor Trb are connected together, and is then fed to the inverting input terminal of the comparator 4.

Furthermore, as shown in FIG. 4, a resistance Ra is connected, at one end thereof, to the inverting input terminal of the comparator 4 and, at the other end thereof, to a node at which the source of the MOS transistor Tra and the drain of the MOS transistor Trb are connected together, and a constant-current power supply 11 that feeds a constant current is connected to the inverting input terminal of the comparator 4. The other end of the constant-current power supply 11 is grounded. In this way, by connecting the resistance Ra and the constant-current power supply 11 together, a voltage drop Ra×Ioff across the resistance Ra caused by the passage of a constant current Ioff fed from the constant-current power supply 11 through the resistance Ra is added as an offset voltage Voff. That is, the resistance Ra and the constant-current power supply 11 function as a voltage source 20.

Here, assume that the supply voltage is Vcc, the ON resistance of the MOS transistor Trb is Rx, and the current value flowing through the MOS transistor Tra relative to the current value IL of the coil L is A×IL. Then, a voltage given by Vcc−Rx×A×IL, appears at a node at which the source of the MOS transistor Tra and the drain of the MOS transistor Trb are connected together. When the voltage given by Vcc−Rx×A×IL is outputted as an output of the current detection circuit 10 and is then fed to one end of the resistance Ra, a voltage given by Vcc−Rx×A×IL−Ra×Ioff (=Vcc−Rx×A×IL−Voff), the voltage given an offset resulting from the voltage drop across the resistance Ra, is fed to the inverting input terminal of the comparator 4 as a voltage VL.

Second Embodiment

Figure 5:
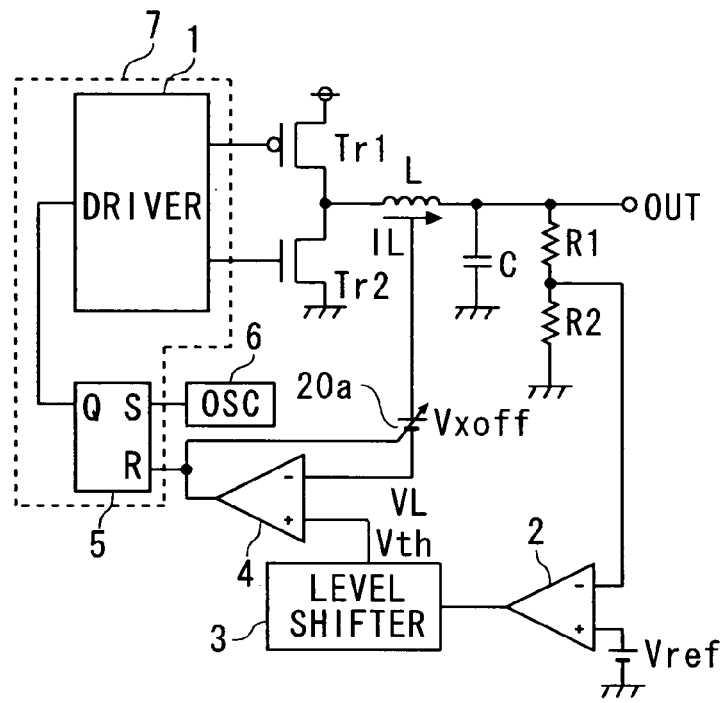
FIG. 5 A block diagram showing the internal configuration of the switching power supply apparatus of a second embodiment.

A second embodiment of the present invention will be described with reference to the accompanying drawings. FIG. 5 is a block diagram showing the internal configuration of the switching power supply apparatus of this embodiment. In the following description of the switching power supply apparatus shown in FIG. 5, such devices and circuit blocks as serve the same purpose as those of the switching power supply apparatus shown in FIG. 1 do are identified with the same reference characters, and their detailed explanations will not be repeated.

The switching power supply apparatus shown in FIG. 5 includes, instead of a voltage source 20 provided in the switching power supply apparatus shown in FIG. 1, a voltage source 20a for adding an offset voltage Vxoff that is switchable depending on an output of a comparator 4. That is, when a current value IL flowing through a coil L is converted into a voltage value VL and is then inputted to the inverting input terminal of the comparator 4, the offset voltage Vxoff from the voltage source 20a is added thereto. At this time, when the output of the comparator 4 turns to high level, the value of the offset voltage Vxoff from the voltage source 20a becomes Vhoff (for example, 30 mV); when the output of the comparator 4 turns to low level, the value of the offset voltage Vxoff from the voltage source 20a becomes Vloff (for example, 20 mV). The relationship between the offset voltage Vhoff and the offset voltage Vloff is Vhoff>Vloff.

In the switching power supply apparatus configured as described above, the operation performed when a heavy load is connected to an output terminal OUT that is a node at which the coil L and a capacitor C are connected together will be first described below. This switching power supply apparatus operates in the same manner as the switching power supply apparatus (FIG. 1) of the first embodiment except that the value of the voltage VL is switched when the value of the offset voltage Vxoff from the voltage source 20a is switched depending on the output of the comparator 4. Therefore, in the following descriptions, emphasis will be placed on the operation performed when the output of the comparator 4 is switched. For operations of the other circuit blocks, reference should be made to the descriptions of the first embodiment.

Figure 6:
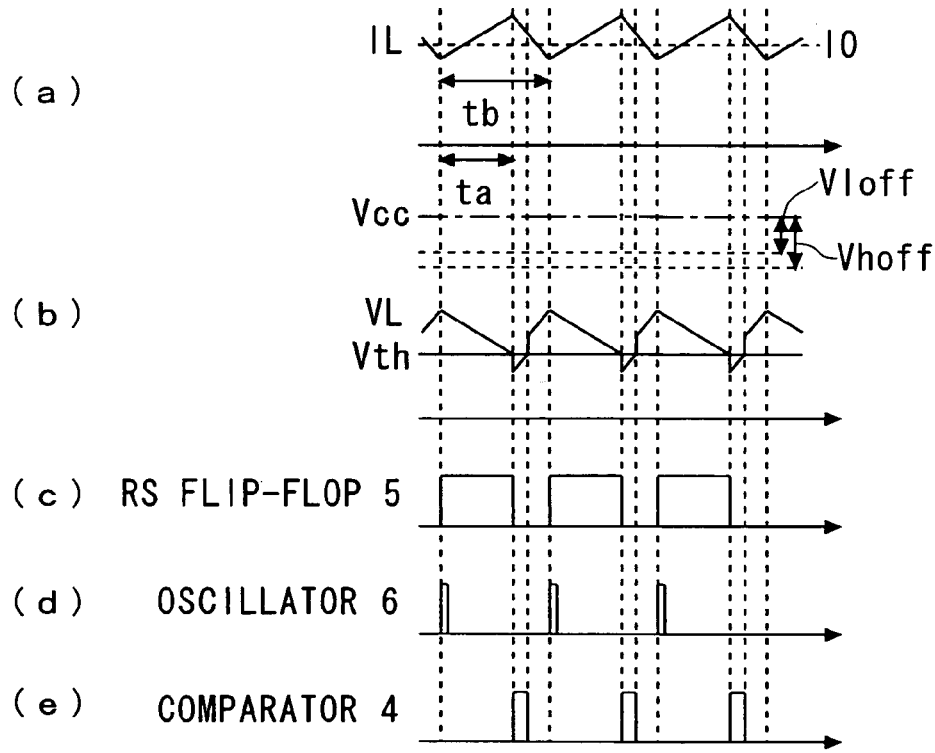
FIG. 6 A timing chart showing how relevant parts of the switching power supply apparatus shown in FIG. 5 operate at heavy load.

A transition diagram showing the transition of the signals of relevant parts of the switching power supply apparatus of this embodiment is shown in FIG. 6. As is the case with the first embodiment, when a current flows from a MOS transistor Tr1 to the coil L, and thus the current value IL flowing through the coil L increases, as shown in FIG. 6(a), the voltage VL inputted to the inverting input terminal of the comparator 4 decreases, as shown in FIG. 6(b). As shown in FIG. 6(b), if the voltage VL becomes lower than the voltage Vth inputted from the level shifter 3 to the non-inverting input terminal of the comparator 4 when time ta has elapsed after reception of the high-level clock signal from the oscillator 6, a high-level signal is outputted from the comparator 4, as shown in FIG. 6(e).

As a result, since the offset voltage Vxoff from the voltage source 20a is switched from a voltage value Vloff to a voltage value Vhoff, the voltage value of the voltage VL inputted to the inverting input terminal of the comparator 4 decreases by Vhoff−Vloff, as shown in FIG. 6(b). On the other hand, as shown in FIG. 6(c), the signal from the RS flip-flop 5 turns to low level, whereby the driver 1 turns the MOS transistor Tr1 off and the MOS transistor Tr2 on. As a result, the current value IL flowing through the coil L decreases, as shown in FIG. 6(a), and the voltage VL inputted to the inverting input terminal of the comparator 4 increases, as shown in FIG. 6(b).

After that, when the voltage VL becomes higher than the voltage Vth inputted from the level shifter 3 to the non-inverting input terminal of the comparator 4, as shown in FIG. 6(b), a low-level signal is outputted from the comparator 4, as shown in FIG. 6(e). As a result, the offset voltage Vxoff from the voltage source 20a is switched from a voltage value Vhoff to a voltage value Vloff, whereby the voltage value of the voltage VL inputted to the inverting input terminal of the comparator 4 increases by Vhoff−Vloff, as shown in FIG. 6(b). In this way, a switching operation of the offset voltage Vxoff of the voltage source 20a is performed each time the signal from the comparator 4 is switched.

As is the case of the first embodiment, also in this embodiment, when a heavy load is connected as described above, the voltage obtained by detecting the current IL flowing through the coil L is sufficiently higher than the offset voltage Vxoff from the voltage source 20a. That is, the voltage values Vhoff and Vloff added as an offset voltage Vxoff each fall within the voltage range in which the influence thereof on the voltage VL inputted to the inverting input terminal of the comparator 4 is so small that it can be ignored.

Similarly, the operation performed when no load or a light load is connected to the output terminal OUT will be described with reference to FIG. 7. Also in this case, the operation is the same as that of the switching power supply apparatus (FIG. 1) of the first embodiment except that the value of the offset voltage Vxoff from the voltage source 20a is switched depending on the output of the comparator 4. Therefore, in the following descriptions, emphasis will be placed on the operation performed when the output of the comparator 4 is switched. For operations of the other circuit blocks, reference should be made to the descriptions of the first embodiment.

Figure 7:
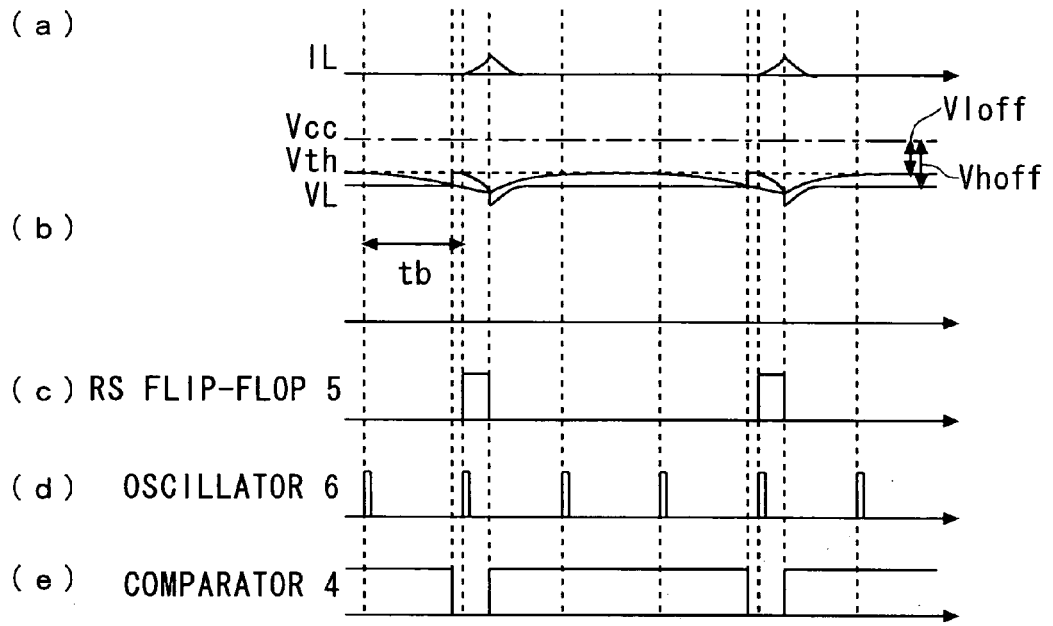
FIG. 7 A timing chart showing how relevant parts of the switching power supply apparatus shown in FIG. 5 operate at light load or no load.

As is the case with the first embodiment, as shown in FIG. 7(*e*), when the comparator 4 outputs high level, the MOS transistor Tr1 is turned off and the MOS transistor Tr2 is turned on, and thus no current flows through the coil L, as shown in FIG. 7(*a*). As a result, the value of the offset voltage Vxoff from the voltage source 20a becomes Vhoff, and, as shown in FIG. 7(*b*), the voltage VL fed to the inverting input terminal of the comparator 4 becomes a value given by Vcc−Vhoff, the value obtained by dropping the supply voltage Vcc by the offset voltage Vhoff. At this time, as shown in FIG. 7(*b*), the voltage Vth outputted from the level shifter 3 is higher than the voltage VL (=Vcc−Vhoff).

Thus, as shown in FIG. 7(*d*), even when a high-level clock signal is outputted from the oscillator 6 at intervals of a time period tb, the RS flip-flop 5 continues to output a low-level output signal, as shown in FIG. 7(*c*), because a high-level signal is inputted from the comparator 4 to the reset terminal of the RS flip-flop 5, as shown in FIG. 7(*e*). Meanwhile, the output voltage of the output terminal OUT decreases, the voltage value of the voltage Vth outputted from the level shifter 3 gradually decreases, as shown in FIG. 7(*b*), and the voltage Vth outputted from the level shifter 3 becomes lower than the voltage VL (=Vcc−Vhoff).

At this time, as shown in FIG. 7(*e*), a low-level signal is outputted from the comparator 4. Thus, the value of the offset voltage Vxoff from the voltage source 20a becomes Vloff, and, as shown in FIG. 7(*b*), the voltage VL fed to the inverting input terminal of the comparator 4 becomes a value given by Vcc−Vloff, the value obtained by dropping the supply voltage Vcc by the offset voltage Vloff. In this way, if a high-level clock signal is outputted from the oscillator 6, as shown in FIG. 7(*d*), after the signal from the comparator 4 is switched to low level, the signal from the RS flip-flop 5 is switched to high level, as shown in FIG. 7(*c*).

As a result, since a current begins to flow through the coil L, as shown in FIG. 7(*a*), the voltage VL inputted to the inverting input terminal of the comparator 4 drops by the current IL flowing through the coil L, as shown in FIG. 7(*b*). When the voltage VL becomes lower than the voltage Vth from the level shifter 3, as shown in FIG. 7(*b*), the signal from the comparator 4 is switched to high level, as shown in FIG. 7(*e*), and thus the signal from the RS flip-flop 5 turns to low level, as shown in FIG. 7(*c*). On the other hand, since the offset voltage Vxoff from the voltage source 20a is switched to Vhoff, the voltage VL inputted to the inverting input terminal of the comparator 4 decreases by Vhoff−Vloff.

As described above, since the signal from the RS flip-flop 5 turns to low level, the current value IL flowing through the coil L decreases, as shown in FIG. 7(*a*), and the voltage VL increases up to Vcc−Vhoff, as shown in FIG. 7(*b*). At this time, the energy stored in the coil L is released, whereby the capacitor C is charged, and thus the output voltage from the output terminal OUT increases. As a result, as shown in FIG. 7(*b*), the voltage Vth from the level shifter 3 increases. After that, the capacitor C is discharged again, whereby the output voltage from the output terminal OUT decreases. In this way, the aforementioned operation is repeated.

Figure 8:
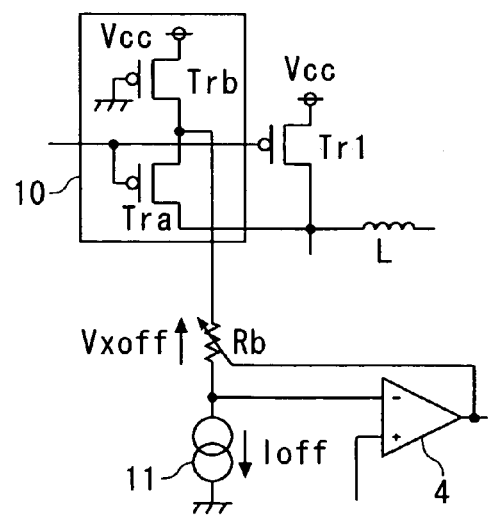
FIG. 8 A circuit diagram showing an example of the configuration of the current detection circuit and a portion surrounding it in the switching power supply apparatus shown in FIG. 5.

When a current detection circuit 10 having the same configuration as that shown in FIG. 4 of the first embodiment is incorporated in the switching power supply apparatus described above, the relation of connection between the current detection circuit 10 and the comparator 4 is shown in FIG. 8. In this case, as shown in FIG. 8, a resistance Ra used for adding an offset voltage Voff is replaced with a variable resistance Rb that can switch a resistance value depending on the output of the comparator 4. That is, the variable resistance Rb and the constant-current power supply 11 constitute a voltage source 20a. Other circuit blocks are the same as those in FIG. 4.

With this configuration, the resistance value of the variable resistance Rb is switched depending on the output of the comparator 4 in such a way that the resistance value obtained when the output of the comparator 4 turns to high level becomes greater than the resistance value obtained when the output of the comparator 4 turns to low level. As a result, the offset voltage Vxoff appearing due to the voltage drop across the variable resistance Rb is switched depending on the output of the comparator 4. The operations other than the resistance value switching operation performed by the variable resistance Rb are the same as in the first embodiment, and therefore no detailed description thereof will be repeated. For these operations, reference should be made to the descriptions of the first embodiment.

As described in this embodiment, by giving hysteresis to an offset voltage to be added to a voltage value indicating a detected current of the coil L by switching the offset voltage depending on the output of the comparator 4, it is possible to make the comparator 4 output a clock signal more reliably than the first embodiment. This helps prevent malfunctioning of the RS flip-flop 5.

Third Embodiment

Figure 9:
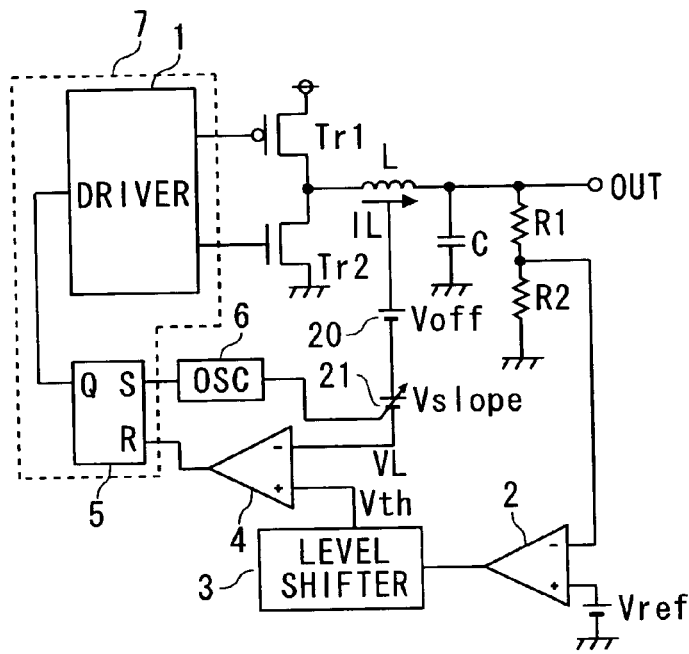
FIG. 9 A block diagram showing the internal configuration of the switching power supply apparatus of a third embodiment.

A third embodiment of the present invention will be described with reference to the accompanying drawings. FIG. 9 is a block diagram showing the internal configuration of the switching power supply apparatus of this embodiment. In the following description of the switching power supply apparatus shown in FIG. 9, such devices and circuit blocks as serve the same purpose as those of the switching power supply apparatus shown in FIG. 1 do are identified with the same reference characters, and their detailed explanations will not be repeated.

The switching power supply apparatus shown in FIG. 9 differs from the switching power supply apparatus shown in FIG. 1 in that a slope compensation signal having a time period tb for performing slope compensation is outputted from an oscillator 6, and a voltage source 21 whose voltage value varies depending on the slope compensation signal is provided between the inverting input terminal of a comparator 4 and a voltage source 20. Thus, when a current value IL flowing through a coil L is converted into a voltage value VL and is then inputted to the inverting input terminal of the comparator 4, an offset voltage Voff and a slope compensation voltage Vslope are added thereto. As described above, the operations of this embodiment are the same as those of the first embodiment except that a voltage value VL fed to the inverting input terminal of the comparator 4 is different from that of the first embodiment. Therefore, in the following descriptions, emphasis will be placed on the relationship between the voltage value VL fed to the inverting input terminal of the comparator 4 and the slope compensation voltage Vslope. For other circuit blocks, reference should be made to the descriptions of the first embodiment.

In the switching power supply apparatus configured as described above, the operation performed when a heavy load is connected to an output terminal OUT that is a node at which the coil L and a capacitor C are connected together will be first described below. This switching power supply apparatus operates in the same manner as the switching power supply apparatus (FIG. 1) of the first embodiment except that the value of the voltage VL varies depending on the slope compensation voltage Vslope. That is, a slope compensation voltage Vslope from the voltage source 21, the slop compensation voltage Vslope varying as shown in FIG. 10(f), and an offset voltage Voff from the voltage source 20 are subtracted from the voltage value obtained from the detected current IL of the coil L, the detected current IL shown in FIG. 10(a), whereby a voltage VL shown in FIG. 10(b) is inputted to the inverting input terminal of the comparator 4.

Figure 10:
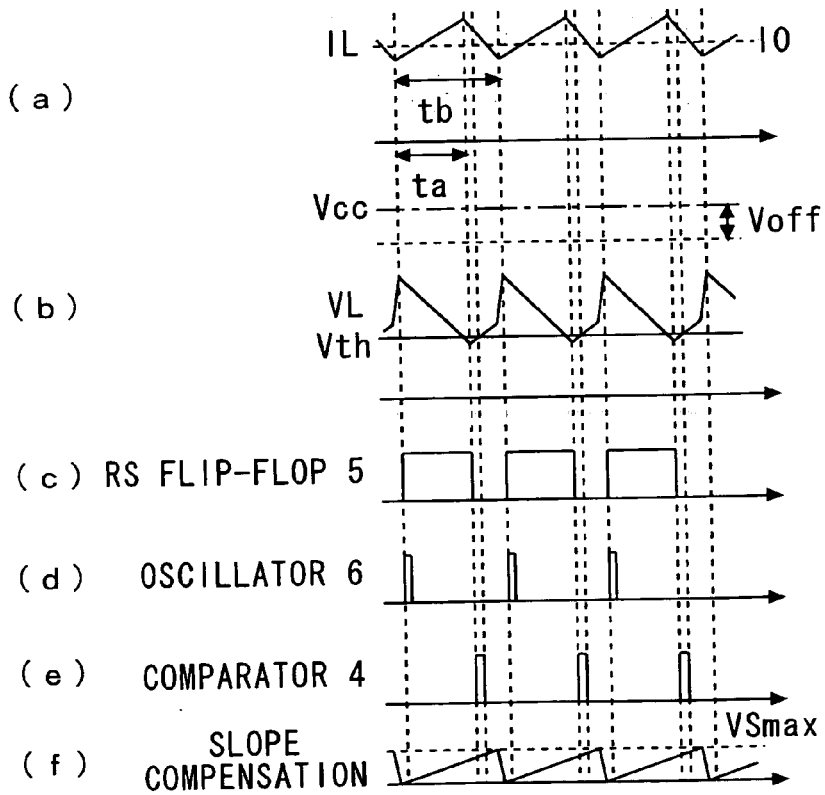
FIG. 10 A timing chart showing how relevant parts of the switching power supply apparatus shown in FIG. 9 operate at heavy load.

At this time, a clock signal that is turned to high level at intervals of a time period tb as shown in FIG. 10(d) and a slope compensation signal having the same time period tb as this clock signal are outputted from the oscillator 6. Thus, as shown in FIG. 10(f), during a time period tb, the slope compensation voltage Vslope from the voltage source 21 gradually increases, and after reaching a maximum value VSmax (for example, 20 mV), it decreases until it reaches a minimum value of zero. As shown in FIGS. 10(c) and 10(f), after the slope compensation voltage Vslope decreases from a maximum value VSmax to a minimum value of zero, a clock signal is outputted from the oscillator 6. As described above, the slope compensation voltage Vslope from the voltage source 21 varies in a roughly triangular wave pattern at intervals of a time period tb, as shown in FIG. 10(f).

The slope compensation voltage Vslope from the voltage source 21 varies as shown in FIG. 10(f). As a result, when the RS flip-flop 5 outputs high level as shown in FIG. 10(c), the rate of change of the voltage VL is greater than that of the first embodiment, as shown in FIG. 10(b). On the other hand, when the RS flip-flop 5 outputs low level as shown in FIG. 10(c), the rate of change of the voltage VL is smaller than that of the first embodiment, as shown in FIG. 10(b). When a clock signal is outputted from the oscillator 6, as shown in FIG. 10(d), and the output of the RS flip-flop 5 is switched from low level to high level, as shown in FIG. 10(c), the value of the slope compensation voltage Vslope from the voltage source 21 changes from VSmax to zero, as shown in FIG. 10(f). As a result, the voltage VL increases by the voltage value VSmax, as shown in FIG. 10(b).

Figure 11:
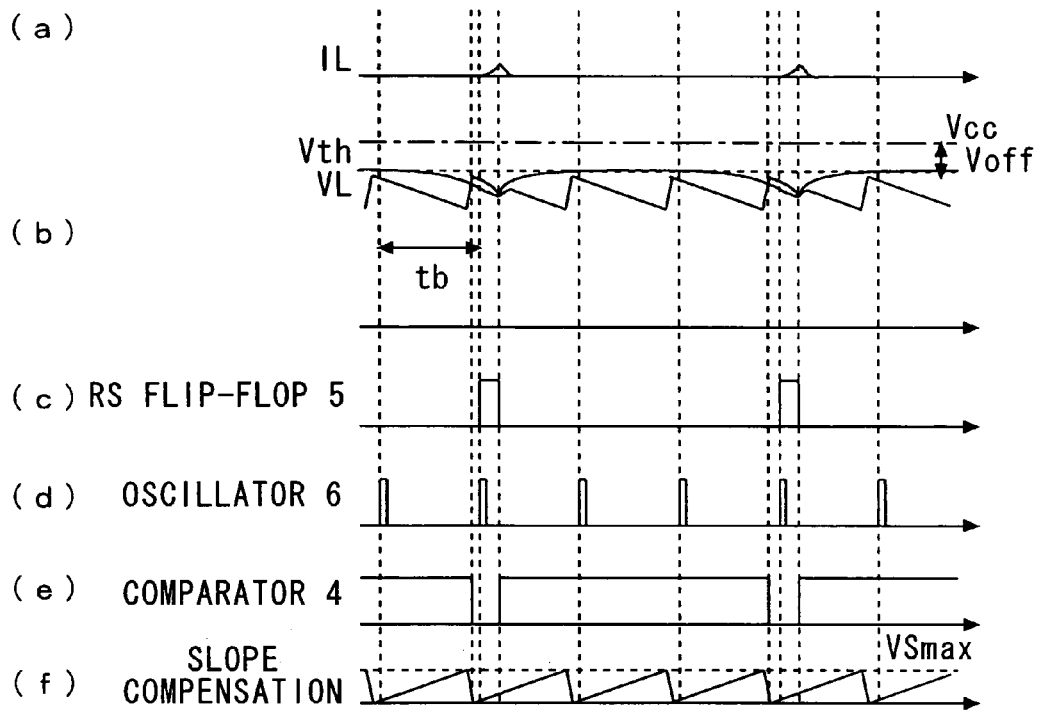
FIG. 11 A timing chart showing how relevant parts of the switching power supply apparatus shown in FIG. 9 operate at light load or no load.

Similarly, the operation performed when no load or a light load is connected to the output terminal OUT will be described with reference to FIG. 11. Also in this case, the operation is the same as that of the switching power supply apparatus (FIG. 1) of the first embodiment except that the value of the voltage VL varies depending on the slope compensation voltage Vslope. That is, a slope compensation voltage Vslope from the voltage source 21, the slope compensation voltage Vslope varying as shown in FIG. 11(f), and an offset voltage Voff from the voltage source 20 are subtracted from the voltage value obtained from the detected current IL of the coil L, the detected current IL shown in FIG. 11(a), whereby the voltage VL shown in FIG. 11(b) is inputted to the inverting input terminal of the comparator 4.

Incidentally, the slope compensation voltage Vslope from the voltage source 21 shown in FIG. 11(f) varies in the same manner as in FIG. 10(f).

As is the case with the first embodiment, as shown in FIG. 11(e), when the comparator 4 outputs high level, the MOS transistor Tr1 is turned off and the MOS transistor Tr2 is turned on, and thus no current flows through the coil L, as shown in FIG. 11(a). As a result, as shown in FIG. 11(b), the voltage VL fed to the inverting input terminal of the comparator 4 becomes a value given by Vcc−Voff−Vslope, the value obtained by dropping the supply voltage Vcc by the offset voltage Voff from the voltage source 20 and the slope compensation voltage Vslope from the voltage source 21, the slope compensation voltage Vslope shown in FIG. 11(f). At this time, as shown in FIG. 11(b), the voltage Vth outputted from the level shifter 3 is higher than the voltage VL (=Vcc−Voff−Vslope).

Thus, as shown in FIG. 11(d), even when a high-level clock signal is outputted from the oscillator 6 at intervals of a time period tb, the RS flip-flop 5 continues to output a low-level signal, as shown in FIG. 11(c), because a high-level signal is inputted from the comparator 4 to the reset terminal of the RS flip-flop 5, as shown in FIG. 11(e). Meanwhile, the output voltage of the output terminal OUT decreases, and the voltage value of the voltage Vth outputted from the level shifter 3 gradually decreases, as shown in FIG. 11(b).

When the slope compensation voltage Vslope from the voltage source 21 decreases from a maximum value VSmax to a minimum value of zero, as shown in FIG. 11(f), immediately before a clock is outputted from the oscillator 6, as shown in FIG. 11(c), the voltage Vth outputted from the level shifter 3 becomes lower than the voltage VL, as shown in FIG. 11(b). That is, when the value of the voltage VL fed to the inverting input terminal of the comparator 4 increases by changing from Vcc−Voff−VSmax to Vcc−Voff, as shown in FIG. 11(b), the voltage Vth becomes lower than the voltage value given by Vcc−Voff.

At this time, as shown in FIG. 11(e), a low-level signal is outputted from the comparator 4, and, immediately after the slope compensation voltage Vslope decreases from a maximum value VSmax to a minimum value of zero, a high-level clock signal is outputted from the oscillator 6, as shown in FIG. 11(d). Thus, a high-level signal is inputted to the set terminal of the RS flip-flop 5 after a low-level signal is inputted to the reset terminal thereof, whereby the signal from the RS flip-flop 5 is switched to high level, as shown in FIG. 11(c). On the other hand, after the slope compensation voltage Vslope reaches to a minimum value of zero, it gradually increases again, as shown in FIG. 11(f). Thus, as shown in FIG. 11(b), as the slope compensation voltage Vslope increases, the voltage VL fed to the inverting input terminal of the comparator 4 decreases.

At this time, since the signal from the RS flip-flop 5 turns to high level, a current begins to flow through the coil L, as shown in FIG. 11(a), and the voltage VL inputted to the inverting input terminal of the comparator 4 drops by the current IL flowing through the coil L, as shown in FIG. 11(b). When the voltage VL becomes lower than the voltage Vth from the level shifter 3, as shown in FIG. 11(b), the signal from the comparator 4 is switched to high level, as shown in FIG. 11(e). As a result, the signal from the RS flip-flop 5 turns to low level, as shown in FIG. 11(c).

As described above, since the signal from the RS flip-flop 5 turns to low level, the current value IL flowing through the coil L decreases, as shown in FIG. 11(a). As a result, the voltage VL increases and becomes Vcc−Voff−Vslope, as shown in FIG. 11(b). At this time, the energy stored in the coil L is released, whereby the capacitor C is charged, and thus the output voltage from the output terminal OUT increases, and the voltage Vth from the level shifter 3 increases, as shown in FIG. 11(b). After that, the capacitor C is discharged again, whereby the output voltage from the output terminal OUT decreases. In this way, the aforementioned operation is repeated.

Figure 12:
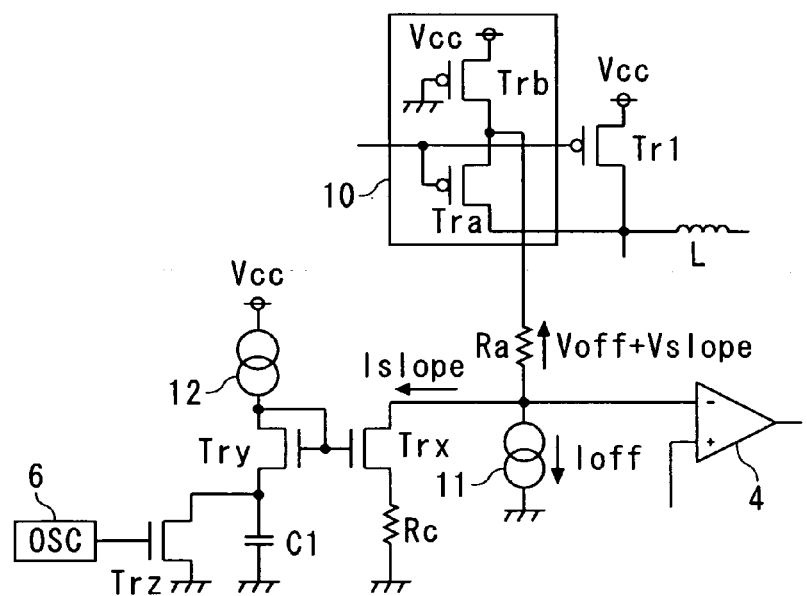
FIG. 12 A circuit diagram showing an example of the configuration of the current detection circuit and a portion surrounding it in the switching power supply apparatus shown in FIG. 9.

When a current detection circuit 10 having the same configuration as that shown in FIG. 4 of the first embodiment is incorporated in the switching power supply apparatus described above, the relation of connection between the current detection circuit 10 and the comparator 4 is shown in FIG. 12. In this case, as shown in FIG. 12, the current source 21 is built with an n-channel MOS transistor Trx that is connected, at the drain thereof, to a node at which the resistance Ra and the constant-current power supply 11 are connected together, a MOS transistor Try that is connected, at the gate and the drain thereof, to the gate of the MOS transistor Trx, a MOS transistor Trz that is connected, at the drain thereof, to the source of the MOS transistor Try, a resistance Rc that is connected to the source of the MOS transistor Trx, a capacitor C1 that is connected to the source of the MOS transistor Try, and a constant-current power supply 12 that is connected to the drain of the MOS transistor Try. Other circuit blocks are the same as those in FIG. 4.

With this configuration, a supply potential is applied to the constant-current power supply 12, the other ends of the capacitor C1 and the resistance Rc are respectively grounded, and a clock signal from the oscillator 6 is inputted to the gate of the MOS transistor Trz. At this time, the voltage Vslope generated by the current source 21 is obtained from the voltage drop given by Ra×Islope, the voltage drop across the resistance Ra caused by the passage of a current Islope through the MOS transistor Trx. On the other hand, as is the case with the first embodiment, the voltage Voff generated by the current source 20 is obtained from the voltage drop given by Ra×Ioff, the voltage drop across the resistance Ra caused by the passage of a current Ioff through the constant-current power supply 11.

That is, when a high-level clock signal is inputted to the gate of the MOS transistor Trz, the MOS transistor Trz is turned on. As a result, the capacitor C1 is discharged, and thus the source voltage of the MOS transistor Try decreases, and the gate voltage of the MOS transistors Trx and Try decreases. Thus, the current value Islope flowing through the MOS transistor Trx decreases, whereby the voltage drop Vslope (=Ra×Islope) across the resistance Ra caused by the passage of the current Islope through the MOS transistor Trx decreases.

When the signal from the oscillator 6 turns to low level, the MOS transistor Trz is turned off. As a result, the capacitor C1 is charged, and thus the source voltage of the MOS transistor Try gradually increases, and the gate voltage of the MOS transistors Trx and Try gradually increases. Thus, the current value Islope flowing through the MOS transistor Trx gradually increases, whereby the voltage drop Vslope (=Ra×Islope) across the resistance Ra caused by the passage of the current Islope through the MOS transistor Trx increases.

As described above, the slope compensation voltage Vslope appears across the resistance Ra, and this slope compensation voltage Vslope is added to the voltage VL inputted to the inverting input terminal of the comparator 4. That is, assume that the supply voltage is Vcc, the ON resistance of the MOS transistor Trb is Rx, and the current value flowing through the MOS transistor Tra relative to the current value IL of the coil L is A×IL. Then, a voltage given by Vcc−Rx×A×IL−(Ioff+Islope) ×Ra (=Vcc−Rx×A×IL−Voff−Vslope), the voltage given an offset resulting from the voltage drop across the resistance Ra, is fed to the inverting input terminal of the comparator 4 as a voltage VL.

As described in this embodiment, adding a slope compensation voltage to a voltage value indicating the detected current of the coil L offers the following advantages. At heavy load it is possible to reduce current variations occurred in the coil L when the duty ratio, i.e., the ratio of the duration of time that the MOS transistor Tr1 is turned on, increases, making it possible to reduce divided frequency oscillation.

On the other hand, at light load or no load, it is possible to make the comparator 4 output low level in synchronism with the reception of a clock signal, achieving more efficient operations than those of the first embodiment.

As is the case with the first embodiment, this embodiment deals with an example in which a constant offset voltage Voff is added by the voltage source 20.

However, as in the second embodiment, there may be provided with a voltage source 20a that switches an offset voltage Vxoff depending on the output of the comparator 4.

By giving hysteresis to the offset voltage Vxoff by switching it with the voltage source 20a, as is the case with the second embodiment, it is possible to make the comparator 4 output a clock signal more reliably that conventionally possible. This helps prevent malfunctioning of the RS flip-flop 5.

Figure 13A:
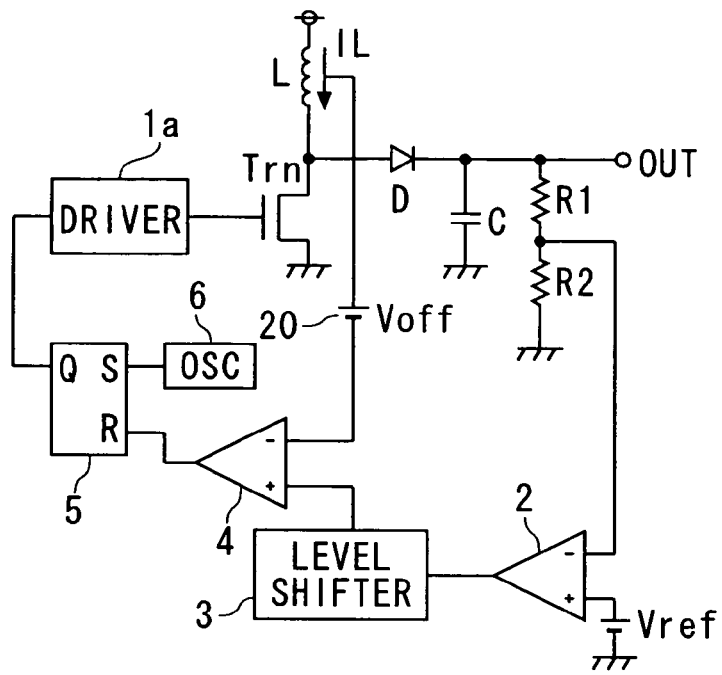
FIG. 13 A block diagram showing an example of the configuration of the apparatus applied to a stepping-up switching power supply apparatus.
FIG. 13B A block diagram showing an example of the configuration of the apparatus applied to an inverting switching power supply apparatus.
Figure 13B:
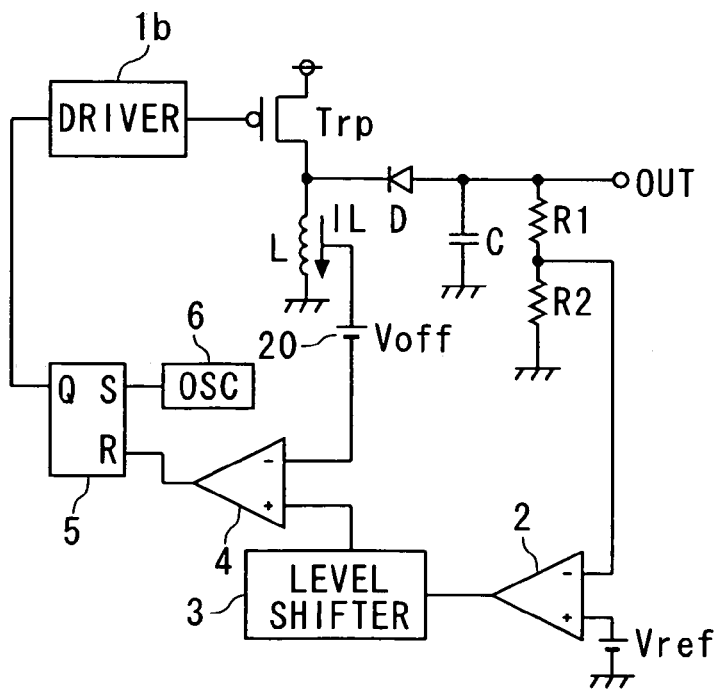

The embodiments described above deal with a stepping-down switching power supply apparatus. However, it is also possible to adopt a stepping-up switching power supply apparatus configured as shown in FIG. 13A, or an inverting switching power supply apparatus configured as shown in FIG. 13B. It is to be noted that, although FIGS. 13A and 13B respectively show the configurations of the stepping-up and inverting switching power supply apparatuses applied to the switching power supply apparatus of the first embodiment, the stepping-up and inverting switching power supply apparatuses can be applied to the switching power supply apparatus of the second or third embodiment.

That is, the stepping-up switching power supply apparatus as shown in FIG. 13A includes a coil L that receives a supply potential at one end thereof, an n-channel MOS transistor Trn that is connected, at the drain thereof, to the other end of the coil L and is controlled by a driver 1a, a diode D that is connected, at the anode thereof, to the drain of the MOS transistor Trn, and a capacitor C that is connected, at one end thereof, to the cathode of the diode D. The current flowing through the coil L or the MOS transistor Trn is fed back to the inverting input terminal of a comparator 4 as a voltage value. At this time, an offset voltage Voff is added thereto by a voltage source 20.

On the other hand, the inverting switching power supply apparatus shown in FIG. 13B includes a coil L that is grounded at one end thereof, a p-channel MOS transistor Trp that is connected, at the drain thereof, to the other end of the coil L and is controlled by a driver 1b, a diode D that is connected, at the cathode thereof, to the drain of the MOS transistor Trp, and a capacitor C that is connected, at one end thereof, to the anode of the diode D. The current flowing through the coil L or the MOS transistor Trp is fed back to the inverting input terminal of a comparator 4 as a voltage value. At this time, an offset voltage Voff is added thereto by a voltage source 20.

The embodiments described above deal with cases in which relevant circuit blocks are made to operate based on a supply potential; instead, they may be made to operate based on a ground potential. In this case, although the polarities of the relevant circuit blocks have to be reversed, the relevant circuit blocks can be basically so configured as to have the same configurations as those of the embodiments described above. Furthermore, the embodiments described above deal with cases in which the output from the differential amplifier is inputted to the comparator via the level shifter. However, the output from the differential amplifier may be directly inputted to the comparator without involving the level shifter.

INDUSTRIAL APPLICABILITY

A switching power supply apparatus of the present invention can be applied to mobile devices such as mobile phones or mobile terminal devices, and, in these mobile devices, it serves as a switching power supply apparatus that transforms the voltage from a rechargeable battery and then feeds it to other circuit arrangements. By configuring the switching power supply apparatus as in the present invention, when the load condition enters light or no load by turning off the other circuit arrangements of the mobile device, it is possible to make the switching power supply apparatus operate with a high degree of efficiency, and thereby to reduce power consumption.

What is claimed is:

1. A switching power supply apparatus, including:
    a switching device for performing an on/off operation;
    a control circuit for controlling on/off of the switching device;
    a coil, a level of a current flowing therethrough being controlled by the switching device;
    a capacitor that is connected to the coil and that performs rectification together with the coil; and
    an oscillator for outputting to the control circuit an oscillating signal at intervals of a fixed time period for turning the switching device on,
    wherein the switching power supply apparatus outputs an output voltage from a node at which the capacitor and the coil are connected together,
    the switching power supply apparatus comprising:
        a current detection portion for detecting a current value flowing through the coil, converting the detected current value into a voltage value, and then outputting the voltage value thus obtained as a current detection voltage;
        a voltage source for adding an offset voltage to the current detection voltage from the current detection portion; and
        a comparator for comparing the current detection voltage to which the offset voltage is added by the voltage source with a voltage commensurate with a difference between a voltage commensurate with the output voltage and a reference voltage,
    wherein, if the comparator finds a magnitude of the current detection voltage to which the offset voltage is added to be greater than the voltage commensurate with a difference between the voltage commensurate with the output voltage and the reference voltage, the oscillating signal from the oscillator is masked, and the switching device is turned off.

2. The switching power supply apparatus of claim 1,
    wherein a slope compensation waveform is superimposed on the current detection voltage to be fed to the comparator.

3. The switching power supply apparatus of claim 2,
    wherein the slope compensation waveform has a same time period as the oscillating signal from the oscillator.

4. The switching power supply apparatus of claim 1,
    wherein the offset voltage fed from the voltage source varies depending on a result of comparison preformed by the comparator.

5. The switching power supply apparatus of claim 1, further comprising:
    a differential amplifier for receiving a voltage commensurate with the output voltage and the reference voltage,
    wherein a voltage commensurate with a difference between the voltage commensurate with the output voltage and the reference voltage, the voltage being outputted from the differential amplifier, is fed to the comparator.

6. The switching power supply apparatus of claim 5, further comprising:
    a level shifter for converting a level of the voltage outputted from the differential amplifier.

7. The switching power supply apparatus of claim 1,
    wherein the control circuit includes
        a flip-flop circuit having a set terminal to which the oscillating signal from the oscillator is inputted and a reset terminal to which an output from the comparator is inputted, and
        a driver for controlling on/off of the switching device depending on an output from the flip-flop circuit.

8. The switching power supply apparatus of claim 1,
    wherein the current detection portion includes
        a detector transistor having a first electrode connected to an output side of the switching device and a control electrode to which a signal to be fed from the control circuit to the switching device is inputted, and
        a resistance that is connected, at one end thereof, to a second electrode of the detector transistor, and that receives a direct-current voltage at another end thereof, wherein a voltage appearing at the second electrode of the detector transistor serves as the current detection voltage.

* * * * *